United States Patent
Diessner et al.

(10) Patent No.: US 12,407,004 B2
(45) Date of Patent: Sep. 2, 2025

(54) METHOD FOR PRODUCING A SEALED FUEL CELL

(71) Applicant: Robert Bosch GmbH, Stuttgart (DE)

(72) Inventors: Christian Diessner, Muehlacker-Muehlhausen (DE); Harald Bauer, Ehningen (DE); Peter Lindner, Sersheim (DE); Thomas Betzitza, Calw (DE); Volker Henrichs, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 479 days.

(21) Appl. No.: 17/926,163

(22) PCT Filed: May 10, 2021

(86) PCT No.: PCT/EP2021/062267
§ 371 (c)(1),
(2) Date: Nov. 18, 2022

(87) PCT Pub. No.: WO2021/233707
PCT Pub. Date: Nov. 25, 2021

(65) Prior Publication Data
US 2023/0197982 A1 Jun. 22, 2023

(30) Foreign Application Priority Data
May 19, 2020 (DE) ............... 10 2020 206 255.2

(51) Int. Cl.
*H01M 8/0286* (2016.01)
*H01M 8/0276* (2016.01)
*H01M 8/0284* (2016.01)

(52) U.S. Cl.
CPC ....... *H01M 8/0286* (2013.01); *H01M 8/0276* (2013.01); *H01M 8/0284* (2013.01)

(58) Field of Classification Search
CPC ............. H01M 8/0286; H01M 8/0276; H01M 8/0284; H01M 8/0204; H01M 2008/1095;
(Continued)

(56) References Cited

U.S. PATENT DOCUMENTS

| 2009/0092885 A1 | 4/2009 | Erikstrup et al. |
| 2011/0256471 A1 | 10/2011 | Xiao |
| 2017/0162882 A1 | 6/2017 | Kawasumi |

FOREIGN PATENT DOCUMENTS

| CN | 102257663 A | 11/2011 |
| CN | 107078317 A | 8/2017 |

(Continued)

OTHER PUBLICATIONS

Translation of International Search Report for Application No. PCT/EP2021/062267 dated Aug. 10, 2021 (2 pages).

*Primary Examiner* — Helen Oi K Conley
(74) *Attorney, Agent, or Firm* — Michael Best & Friedrich LLP

(57) ABSTRACT

The invention relates to a method for producing a sealed fuel cell (101) for a fuel cell stack (100), comprising a cathode-side distributor plate (K), an anode-side distributor plate (A) and a membrane electrode unit (MEA), said method comprising the following steps: 1) providing a cathode-side distributor plate (K) and an anode-side distributor plate (A), 2) providing a first film web (B1) for sealing the cathode-side distributor plate (K) and a second film web (B2) for sealing the anode-side distributor plate (A), 3) punching a cathode-side distributor structure (VK) for the cathode-side distributor plate (K) out of the first film web (B1) and an anode-side distributor structure (VA) for the anode-side distributor plate (A) out of the second film web (B2), 4) cutting the first film web (B1) to produce a first seal (D1) for the cathode-side distributor structure (VK) and cutting the second film web (B2) to produce a second seal (D2) for the (Continued)

anode-side distributor structure (VA), 5) placing the first seal (D1) on the cathode-side distributor plate (K) and the second seal (D2) on the anode-side distributor plate (A), 6) heating the cathode-side distributor plate (K) and the anode-side distributor plate (A) in order to connect together the first seal (D1) on the cathode-side distributor plate (K) and the second seal (D2) on the anode-side distributor plate (A) in an integrally joined manner, more particularly to melt said seals together.

18 Claims, 4 Drawing Sheets

(58) Field of Classification Search
CPC ..... H01M 8/2404; H01M 8/242; Y02E 60/50; Y02P 70/50
See application file for complete search history.

(56) References Cited

FOREIGN PATENT DOCUMENTS

| | | |
|---|---|---|
| CN | 108520968 A | 9/2018 |
| CN | 110010925 A | 7/2019 |
| JP | 2005347255 A | 12/2005 |
| JP | 2005347256 A | 12/2005 |
| JP | 2010251048 A | 11/2010 |
| JP | 2013175336 A | 9/2013 |
| JP | 2017103126 A | 6/2017 |

METHOD FOR PRODUCING A SEALED FUEL CELL

BACKGROUND

The invention relates to a method for producing a sealed fuel cell for a fuel cell stack. In addition, the invention relates to a corresponding sealed fuel cell.

PRIOR ART

Fuel cells are generally known. Often, fuel cells are constructed as stacks of repeat units from a cathode-side distributor plate, an anode-side distributor plate and a membrane electrode unit. The distributor plates together form a bipolar plate. The distributor plates are electrically conductive, but impermeable to gases and ions. The distributor plates distribute the gases over the active surface of the membrane electrode unit. The stacks of such repeat units are pressed together. For a functioning fuel cell stack, the distributor plates must be sealed to form the membrane electrode unit. If rubber seals are used for sealing, they must be attached to the distributor plates and/or to the membrane electrode unit, or inserted between them. This can take place, for example, by injection molding of the seals. However, the seals have tolerances; as a result, the sealing region must also be pressed in order to ensure the electrical contact in the active surface of the membrane electrode unit. Compromises must be made in this case for the sealing and the electrical contact. Injection molding of rubber seals can be complicated and can entail a great deal of waste that cannot be recycled. The seal is usually cast only on one of the distributor plates; the other distributor plate is usually simply pressed against the sealing surface, as a result of which, for example, gases can creep through between the distributor plate and the seal.

SUMMARY

According to a first aspect, the invention provides a method for producing a sealed fuel cell for a fuel cell stack, having the features of the independent method claim. Furthermore, according to a second aspect, the invention provides a corresponding sealed fuel cell, having the features of the independent device claim. Further advantages, features and details of the invention will become apparent from the dependent claims, the description and the drawings. Features and details which are described in connection with the method according to the invention will of course also apply in connection with the fuel cell according to the invention, and vice versa so that, with respect to the disclosure of the individual aspects of the invention, reference is or can be made reciprocally in all cases.

According to the first aspect, the present invention provides a method for producing a sealed fuel cell for a fuel cell stack, comprising the following steps:
1) providing a cathode-side distributor plate and an anode-side distributor plate,
2) providing a first film web for sealing the cathode-side distributor plate and a second film web for sealing the anode-side distributor plate,
3) punching out a cathode-side distributor structure for the cathode-side distributor plate from the first film web and an anode-side distributor structure for the anode-side distributor plate from the second film web,
4) cutting the first film web to produce a first seal for the cathode-side distributor structure and the second film web to produce a second seal for the anode-side distributor structure,
5) placing the first seal on the cathode-side distributor plate and the second seal on the anode-side distributor plate,
6 heating the cathode-side distributor plate and the anode-side distributor plate in order to connect together the first seal on the cathode-side distributor plate and the second seal on the anode-side distributor plate in an integrally joined manner, more particularly to melt said seals together.

Within the scope of the invention, it is conceivable that the steps of the method according to the invention, in particular steps 4) and 5), are carried out in the specified sequence or in a modified sequence, or simultaneously.

The distributor plates within the meaning of the invention can likewise be referred to as monopolar plates which come to rest against a complementary monopolar plate of the following fuel cell, or against a housing plate, when such sealed fuel cells are stacked to form a fuel cell stack.

The fuel cell stack according to the invention can have a plurality of repeat units in the form of sealed fuel cells according to the invention. The fuel cell stack according to the invention can advantageously be used for mobile applications, such as in motor vehicles, or for stationary applications, such as in generator systems, by way of example.

The fuel cell stack according to the invention is advantageously suitable for rapid and cost-effective mass production, in particular assembly line production.

The idea of the invention is that the active region and the ports of the relevant distributor structure are punched out of a preferably thermoplastic film web, for example a polymer film web, for example a PVDF film web, as a web item. The stamped waste may advantageously be collected and recycled. A stamped film web is in each case placed on a (for example metal) surface of the anode-side distributor plate and the cathode-side distributor plate. By placing the relevant film web and, for example, partially heating the distributor plates, the film web is melted on the distributor plates, at least in the sealing regions. The heating of the distributor plates can take place, for example, by heated punches or rollers, IR radiators and/or inductive heaters, and/or even resistance heating of the distributor plates. Preferably, a defined heating of the distributor plates can take place so that the film web only melts superficially upon contact with the distributor plate, and can be pressed against the warm film from the rear (cold side of the film) with a tool, which is, for example, cooled. Within the scope of the invention, the relevant seal can thus be laminated onto the relevant distributor plate. In the context of the invention, the film web can be cut to size before or after or simultaneously with the placement on the relevant distributor plate.

Subsequently, distributor plates produced in this way and each having a melted seal can be stacked with a membrane electrode unit, wherein the plates are each placed on the membrane electrode unit with the sealing sides. This means that the film sides of the distributor plates face each other and enclose the membrane electrode unit. The membrane electrode unit may possibly be provided with gas diffusion layers and can optionally be enclosed or framed in a gasket as an edge reinforcement. Furthermore, the stack height can be adapted in an advantageous manner in the region of the membrane electrode unit. For this purpose, the sealed fuel cell according to the invention can be briefly heated in the sealing region so that the polymer of the respective seals can be plasticized. The fuel cell can thus be set to an exact spacing distance. The softened polymer can thus also surround the membrane electrode unit and/or adhere to the distributor plates, impregnate the gas diffusion layers on the edges, and/or connect the distributor plates to one another. In this way, the fuel cell can be provided as an individually manipulable module unit which is integrally completely sealed and free of mechanical stresses.

The connection of such sealed fuel cells to a fuel cell stack can take place by stacking a plurality of sealed fuel cells within the meaning of the invention, and optionally suitably sealing the distributor plates of the successive fuel cells on the coolant sides. The seal in this position is less critical than in the gas region, and constitutes a lower risk for the stacking. In addition, it is conceivable within the scope of the invention to put individual supporting welding spots on the external coolant sides of the distributor plates, which can be used for positioning and/or integrally joining the distributor plates of adjacent fuel cells.

In other words, the idea of the invention is that a cost-effective seal is provided as a web item and may optionally be placed over the entire area of the edge region (without ports and without an active region) and can be melted there. The tolerance compensation in the stacking direction can advantageously be implemented by re-plasticizing the seal. With the aid of the invention, a mechanical decoupling between the seal in the membrane region and the pressing in the sealing region is made possible. By using recyclable thermoplastic polymer, the waste can be reduced. Various polymers, copolymers, multi-layer film composites, etc. are conceivable as material for the film web from which the seal is cut. According to a further advantage of the invention, such seals can also be attached to non-planar substrates in the form of polymer films, for example to seal oblique surfaces. As such, the distributor plates can have contours which engage in one another, and nevertheless are reliably sealed.

Furthermore, the invention can provide, in a method for producing a sealed fuel cell, that, in step 6), the cathode-side distributor plate and the anode-side distributor plate are partially heated, in particular in the region of the first seal and correspondingly of the second seal. In this way, the seals can be integrally joined to the distributor plates in a targeted and accordingly efficient manner.

Furthermore, the invention can provide, in a method for producing a sealed fuel cell, that, in step 6), the cathode-side distributor plate and the anode-side distributor plate are heated by means of punches or rollers, IR radiators, and/or inductive heaters, which are in particular heated. In this way, an efficient and uniform connection of the seals to the distributor plates can be made possible.

Furthermore, the invention can provide, in a method for producing a sealed fuel cell, that, in step 6), the cathode-side distributor plate and the anode-side distributor plate are heated in a targeted manner, in particular inductively, without heat being introduced into the first seal, and correspondingly into the second seal. In this way it can be made possible that only a superficial layer of the film web which comes into contact with the relevant distributor plate is melted to produce the material connection with the distributor plate, and that the remaining material of the film web remains substantially intact in order to provide improved sealing properties.

In addition, the invention can provide, in a method for producing a sealed fuel cell, that the method comprises at least one further of the following steps:

7) stacking the cathode-side distributor plate with the attached first seal, a membrane electrode unit, and the anode-side distributor plate with the attached second seal to form a sealed fuel cell, wherein in particular the sealing sides of the distributor plates face the direction of a membrane electrode unit, 8) heating the cathode-side distributor plate with the attached first seal and the anode-side distributor plate with the attached second seal in order to adjust the height of the sealed fuel cell in a targeted manner.

As such, a desired and/or required thickness or height of the finished sealed fuel cell can be adjusted and/or easily adapted in a further step. By melting the seals in the composite stack with the membrane electrode unit, the seals can advantageously enclose the edge of and reliably seal the membrane electrode unit with gas diffusion layers that may be attached thereto.

In addition, the invention can provide, in a method for producing a sealed fuel cell, that, in step 1), the cathode-side distributor plate and the anode-side distributor plate are made from an electrically and/or thermally conductive, in particular metal material, carbon material, and/or conductive plastics material. In this way, the electron transport and/or heat transport through the distributor plates can be ensured.

Furthermore, the invention can provide, in a method for producing a sealed fuel cell, that, in step 2), the first film web for sealing the cathode-side distributor plate and the second film web for sealing the anode-side distributor plate can be made from a preferably thermoplastic polymer or copolymer (which is, in particular, identical, so as to simplify production; or is different, so as to make it possible to provide individual seals for the anode side and the cathode side of the fuel cell). As such, heat-treatable seals can be provided that have recyclable waste material.

Furthermore, the invention can provide, in a method for producing a sealed fuel cell, that, in step 2), the first film web for sealing the cathode-side distributor plate and the second film web for sealing the anode-side distributor plate are provided as an extrusion film, in particular by means of screw extrusion, preferably by means of coextrusion, for example as a film tube which can subsequently be cut open at the edge, or as a flat film web. As such, cost-effective and rapid production of the seals as web items is made possible.

Furthermore, the invention can provide, in a method for producing a sealed fuel cell, that, in step 2), the first film web for sealing the cathode-side distributor plate and the second film web for sealing the anode-side distributor plate are provided as a multilayer film, in particular with a plurality of functional layers which can have different melting temperatures, for example. In this way, the functionality can be expanded within the scope of the film webs according to the invention. Different properties of the seals can advantageously be provided by different layers of the relevant film web. For example, a layer intended for melting to the distributor plate can have a low melting temperature. A further layer can have improved insulation properties, for example for the port regions of the distributor layers. Yet another layer can, for example, provide improved corrosion resistance, in particular with respect to the fuel-containing gas.

According to the second aspect of the invention, a fuel cell is provided which is produced by means of a method which can proceed as described above. The fuel cell according to the invention can achieve the same advantages which were described above in connection with the method according to the invention. These advantages are referred to in full in the present case. The fuel cell according to the invention is, in an improved manner, sealed without stresses and reliably electrically contacted.

BRIEF DESCRIPTION OF THE DRAWINGS

The invention, its developments and their advantages are explained in more detail below with reference to the drawings. In the drawings, in each schematically.

DETAILED DESCRIPTION

In the different figures, the same parts of the invention are always provided with the same reference numbers, which is why they are usually only described once.

Figure 1:
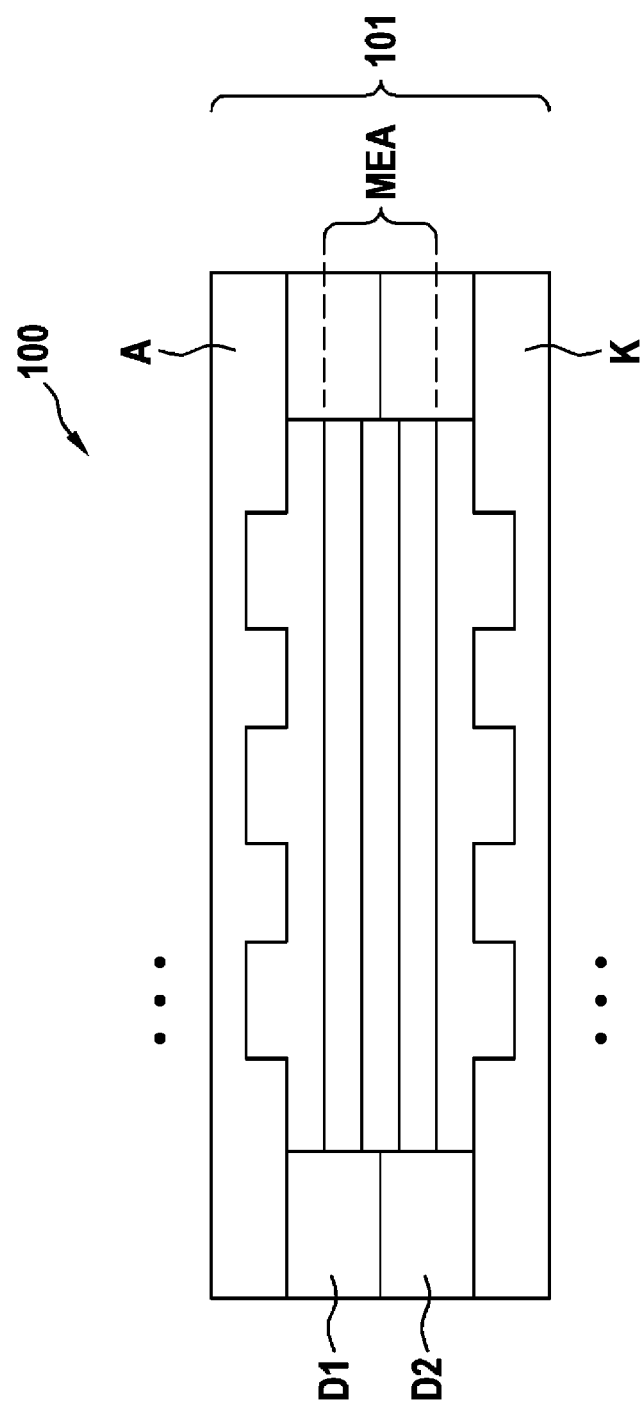
FIG. 1 is a schematic representation of an exemplary fuel cell stack within the meaning of the invention.

FIG. 1 shows a fuel cell stack 100 within the meaning of the invention. The fuel cell stack 100 according to the invention can be formed with a plurality of stacked repeat units in the form of individual fuel cells 101. The fuel cell stack 100 according to the invention can be used for different mobile and stationary applications.

Figure 2:
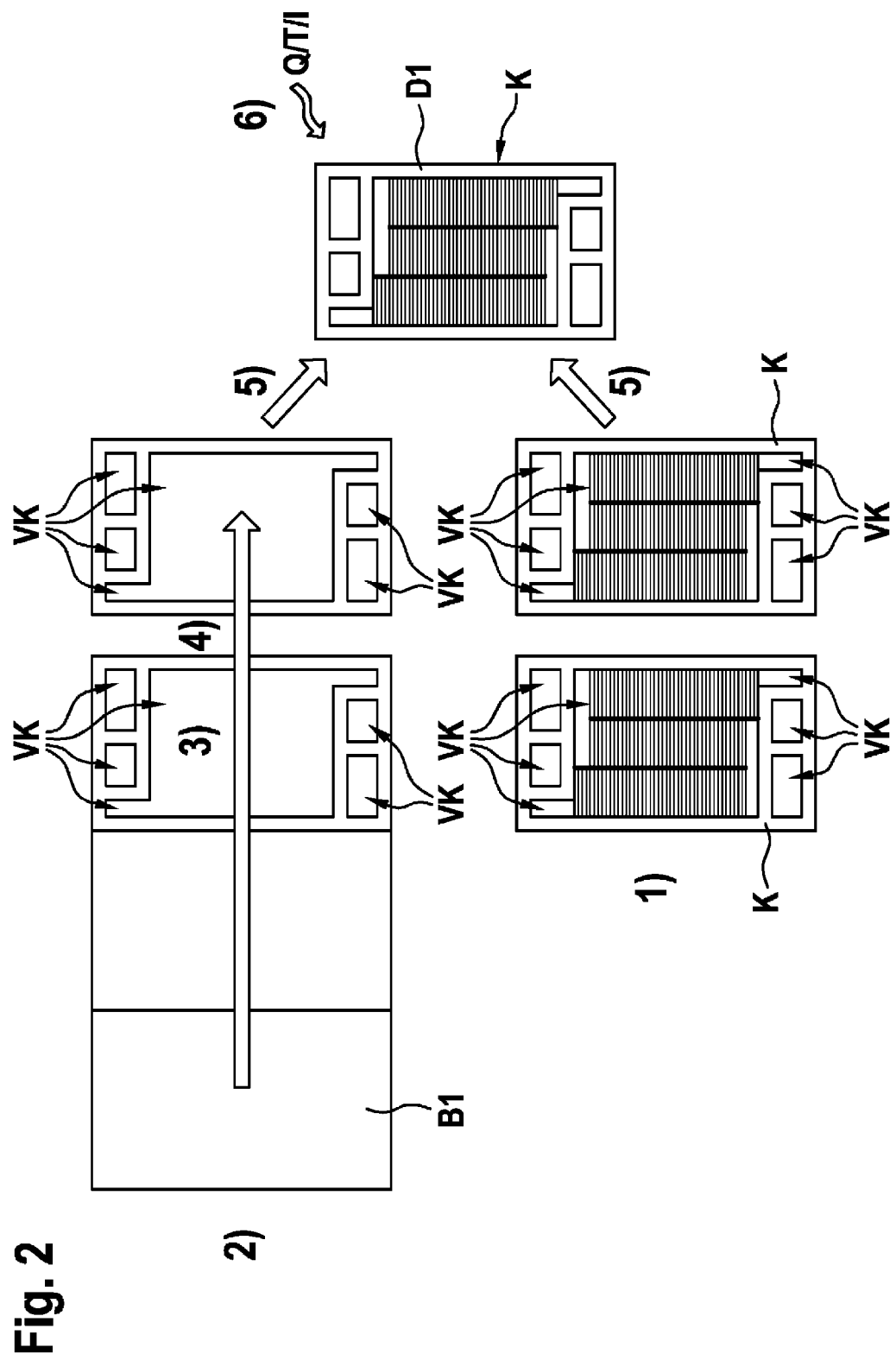
FIG. 2 is a schematic sequence of a method according to the invention for attaching a first seal to a cathode-side distributor plate.
Figure 3:
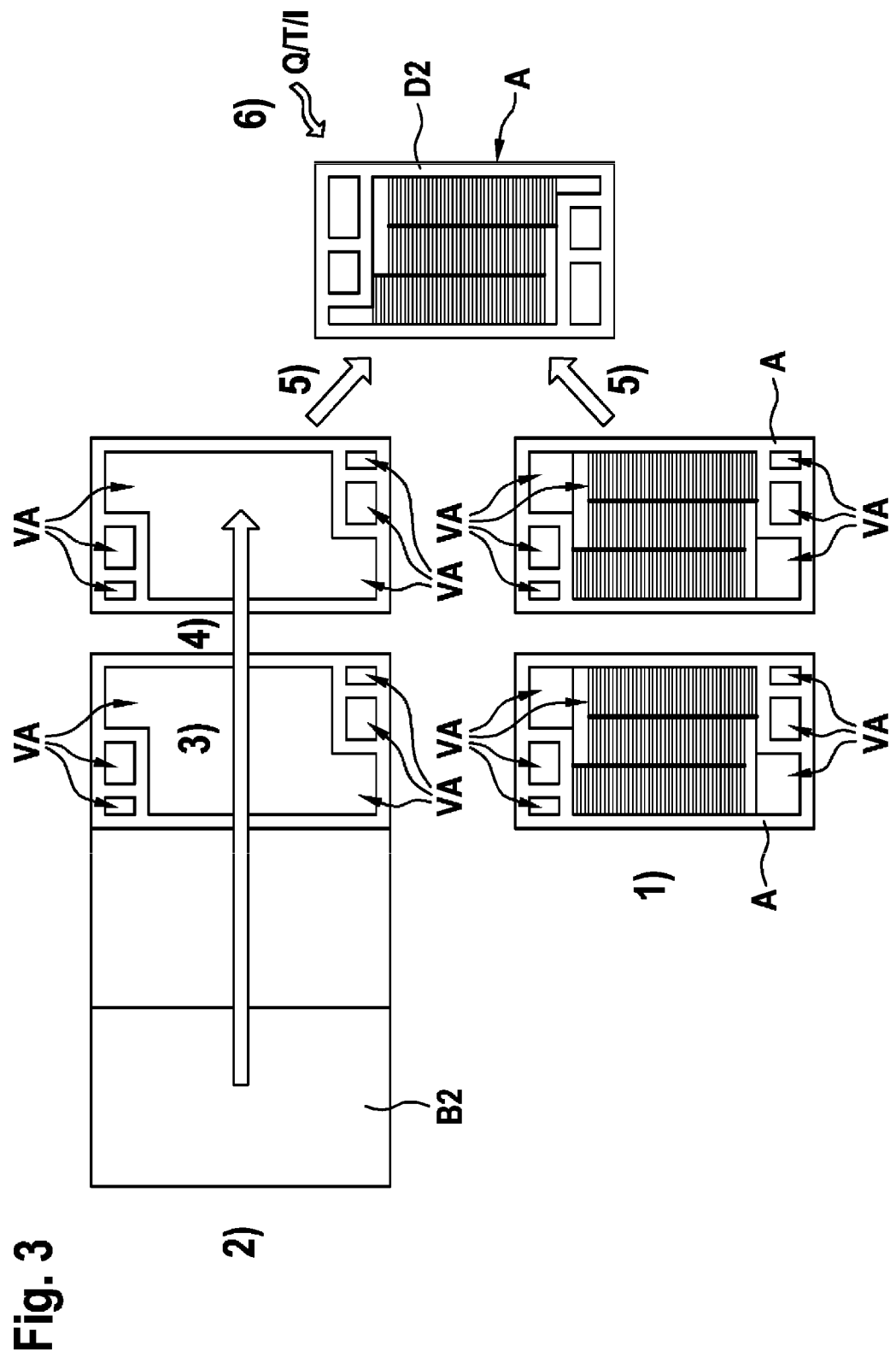
FIG. 3 is a schematic sequence of a method according to the invention for connecting a second seal to an anode-side distributor plate.
Figure 4:
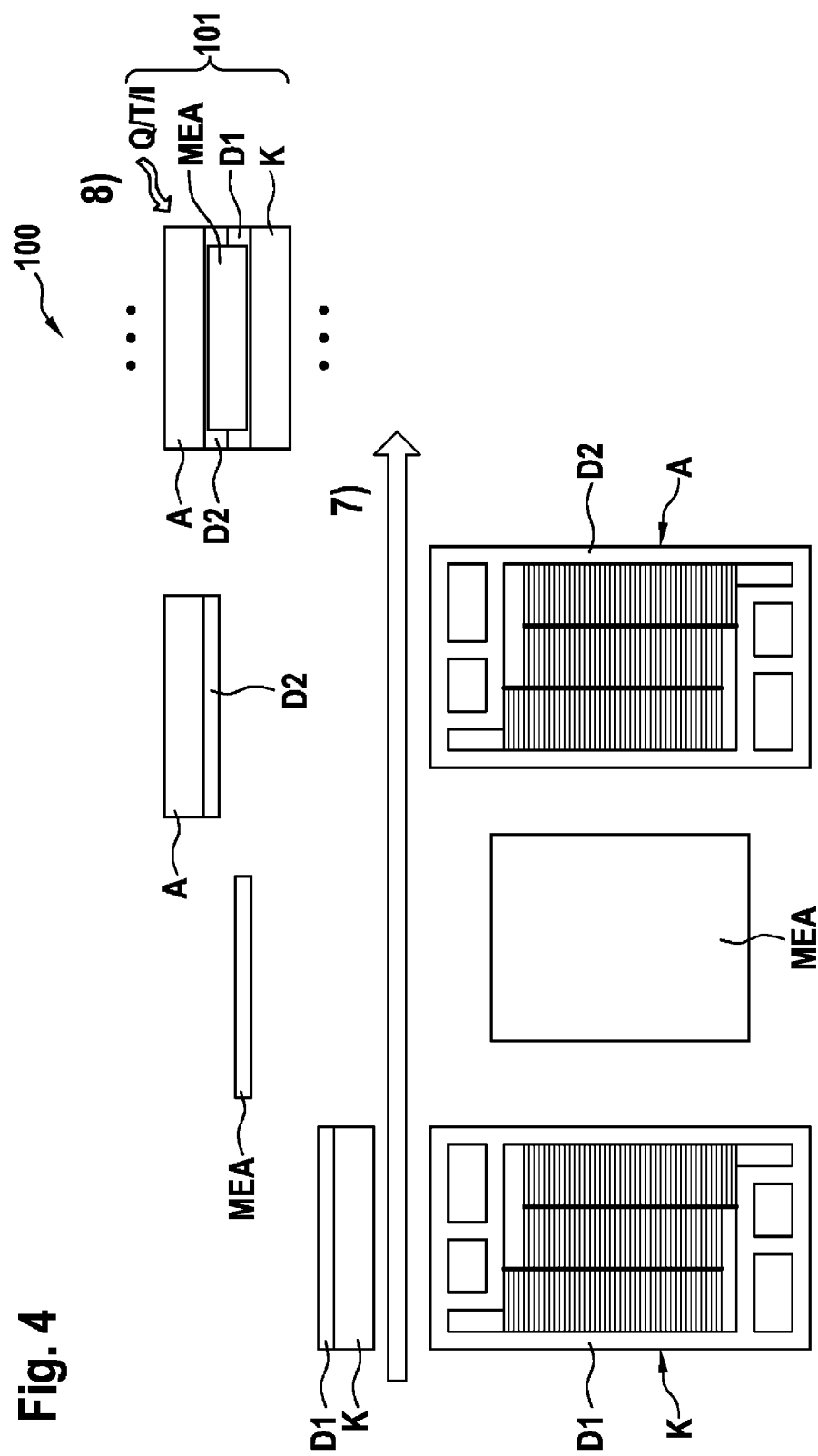
FIG. 4 is a schematic sequence of a method according to the invention for stacking a fuel cell within the meaning of the invention.

FIGS. 2 to 4 are used to clarify a sequence of a method within the meaning of the invention, which is used to produce a sealed fuel cell for a fuel cell stack. The method according to the invention can comprise the following steps:
1) providing a cathode-side distributor plate K and an anode-side distributor plate A,
2) providing (for example by extrusion) a first film web B1 for sealing the cathode-side distributor plate K and a second film web B2 for sealing the anode-side distributor plate A,
3) punching out a cathode-side distributor structure VK for the cathode-side distributor plate K from the first film web B1 and an anode-side distributor structure VA for the distributor plate A on the anode side from the second film web B2,
4) cutting the first film web B1 to produce a first seal D1 for the cathode-side distributor structure VK and the second film web B2 to produce a second seal D2 for the anode-side distributor structure VK,
5) placing the first seal D1 on the cathode-side distributor plate K and the second seal D2 on the anode-side distributor plate A,
6) heating the cathode-side distributor plate K and the anode-side distributor plate A in order to connect together the first seal D1 on the cathode-side distributor plate K and the second seal D2 on the anode-side distributor plate A in an integrally joined manner, more particularly to melt said seals together.

As shown in FIGS. 2 and 3, steps 4) and 5) can be carried out in the specified sequence or in a modified sequence, or even simultaneously.

The distributor plates K, A can also be referred to as monopolar plates which come to rest against a complementary monopolar plate of the following fuel cell 101 or against a housing plate GP when such sealed fuel cells 101 are stacked to form a fuel cell stack 100.

The finished fuel cell stack 100 can have a plurality of repeat units in the form of fuel cells 101 sealed by means of the method according to the invention. The method according to the invention advantageously allows rapid and cost-effective mass production, in particular assembly line production, of fuel cells 101.

In step 2), one film web B1, B2 in the form of a preferably thermoplastic polymer film web, for example a PVDF film web, is provided as a web item for a cathode side (see FIG. 2) and for an anode side (see FIG. 3) of the fuel cell 101 (made of the same or separate materials).

In step 3), the active region and the ports of the relevant distributor structure VK, VA are punched out of the relevant film web B1, B2. The waste may be collected and recycled within the scope of the invention.

In each case, a punched-out film web B1, B2 is placed on a membrane-side surface of the cathode-side distributor plate K (see FIG. 2) and the anode-side distributor plate A (see FIG. 3) in step 5). By applying the film webs B1, B2 in step 5) and preferably partially heating the distributor plates K, A in step 6), the relevant film web B1, B2 is melted on the distributor plates K, A, at least on the sealing regions.

The heating of the distributor plates K, A in step 6) and a further step 8) can be performed, for example, by heated punches or rollers (not shown), IR radiators, and/or inductive heaters, and/or even by resistance heating of the distributor plates. This is indicated in FIGS. 2 and 3, as well as in FIG. 4, by the characters Q for heat, T for temperature, and I for current.

Within the scope of the invention, a defined heating of the distributor plates K, A can preferably take place, for example, by means of inductive heating, such that the film web B1, B2 only melts superficially upon contact with the relevant distributor plate K, A, and can be pressed from the rear (cold side of the film web B1, B2) with an, e.g., cooled, tool against the warm film surface or film layer. In other words, the relevant seal D1 can be laminated onto the relevant distributor plate K, A. For this purpose, the film web B1, B2 can have one or more functional layers which can have different properties with regard to melting temperature, corrosion resistance, and/or electrical insulation.

The film web B1, B2 can be cut in step 4) before or after or simultaneously with the placement on the relevant distributor plate K, A in step 5).

As shown in FIG. 4, the sealed distributor plates K, A, each having a melted seal D1, D2, can be stacked with a membrane electrode unit MEA in a further possible step 7) to form a fuel cell 101, wherein the plates K, A are each placed with the sealing sides on the membrane electrode unit MEA. The seals D1, D2 can surround the membrane electrode unit MEA like a frame. The membrane electrode unit MEA can optionally be provided with gas diffusion layers and, if necessary, be enclosed or framed in a gasket as an edge reinforcement.

In a further possible step 8), the stack height of the fuel cell 101 can be adjusted and/or adapted in an advantageous manner. For this purpose, in step 7), the fuel cell 101, which is stacked according to the invention, can be briefly heated again in the sealing region, so that the material of the respective seals D1, D2 can be melted. The fuel cell 101 can thus be adjusted to an exact spacing distance. The softened material of the seals D1, D2 can thereby surround the membrane electrode unit MEA on the edge and/or bond it to the distributor plates K, A. The optional gas diffusion layers can thus also be impregnated on the edge. Advantageously, the distributor plates K, A can thus be connected to one another. In this way, the fuel cell 101 can be provided as a coherent composite which is completely sealed and free of mechanical stresses.

A fuel cell 101, which is produced by means of a method which can proceed as described above, likewise forms an aspect of the invention. A corresponding fuel cell stack 100 having a plurality of such fuel cells 101 can likewise constitute an aspect of the invention.

The above description of the figures describes the present invention exclusively in the context of examples. Of course, individual features of the embodiments, provided it makes technical sense, can be freely combined with one another without departing from the scope of the invention.

The invention claimed is:

1. A method for manufacturing a sealed fuel cell (101) for a fuel cell stack (100), comprising the following steps:
    1)| providing a cathode-side distributor plate (K) and an anode-side distributor plate (A),
    2) Providing a first film web (B1) for sealing the cathode-side distributor plate (K) and a second film web (B2) for sealing the anode-side distributor plate (A),
    3) Punching out a cathode-side distributor structure (VK) for the cathode-side distributor plate (K) from the first film web (B1) and an anode-side distributor structure (VA) for the anode-side distributor plate (A) from the second film web (B2),
    4) Cutting the first film web (B1) to produce a first seal (D1) for the cathode-side distributor structure (VK) and the second film web (B2) to produce a second seal (D2) for the anode-side distributor structure (VA),
    5) Placing the first seal (D1) on the cathode-side distributor plate (K) and the second seal (D2) on the anode-side distributor plate (A),
    6) Heating the cathode-side distributor plate (K) and the anode-side distributor plate (A) in order to connect together the first seal (D1) on the cathode-side distributor plate (K) and the second seal (D2) on the anode-side distributor plate (A) in an integrally joined manner.

2. The method according to claim 1, wherein
    in step 6), the cathode-side distributor plate (K) and the anode-side distributor plate (A) are partially heated.

3. The method according to claim 1, wherein
    in step 6), the cathode-side distributor plate (K) and the anode-side distributor plate (A) are heated by punches or rollers, IR radiators, and/or inductive heaters.

4. The method according to claim 1, wherein
    in step 6), the cathode-side distributor plate (K) and the anode-side distributor plate (A) are heated in a targeted manner without heat being introduced into the first seal (D1) and correspondingly into the second seal (D2).

5. The method according to claim 1, wherein
    the method comprises at least one further step from the following steps:
    7) Stacking the cathode-side distributor plate (K) with the attached first seal (D1), a membrane electrode unit (MEA), and the anode-side distributor plate (A) with the attached second seal (D2) to form a sealed fuel cell (101),
    8) Heating the cathode-side distributor plate (K) with the attached first seal (D1) and the anode-side distributor plate (A) with the attached second seal (D2) in order to adjust a height of the sealed fuel cell (101) in a targeted manner.

6. The method according to claim 1, wherein
    in step 1), the cathode-side distributor plate (K) and the anode-side distributor plate (A) are made from an electrically and/or thermally conductive, in particular metal material, carbon material, and/or conductive plastics material.

7. The method according to claim 1, wherein
    in step 2), the first film web (B1) for sealing the cathode-side distributor plate (K) and the second film web (B2) for sealing the anode-side distributor plate (A) are made from a thermoplastic polymer or copolymer.

8. The method according to claim 7, wherein
    in step 2), the first film web (B1) for sealing the cathode-side distributor plate (K) and the second film web (B2) for sealing the anode-side distributor plate (A) are provided as an extrusion film, as a film tube or as a flat film web.

9. The method according to claim 1, wherein
    in step 2), the first film web (B1) for sealing the cathode-side distributor plate (K) and the second film web (B2) for sealing the anode-side distributor plate (A) are provided as a multilayer film.

10. A sealed fuel cell (101) for a fuel cell stack (100) produced according to a method according to claim 1.

11. The method according to claim 1, wherein heating the cathode-side distributor plate (K) and the anode-side distributor plate (A) in order to connect together the first seal (D1) on the cathode-side distributor plate (K) and the second seal (D2) on the anode-side distributor plate (A) in an integrally joined manner includes melting the first and second seals together.

12. The method according to claim 2, wherein the cathode-side distributor plate (K) and the anode-side distributor plate (A) are partially heated in a region of the first seal (D1) and correspondingly of the second seal (D2).

13. The method according to claim 4, wherein the cathode-side distributor plate (K) and the anode-side distributor plate (A) are heated inductively.

14. The method according to claim 6, wherein the cathode-side distributor plate (K) and the anode-side distributor plate (A) are made from an electrically and/or thermally conductive metal material.

15. The method according to claim 7, wherein the first film web (B1) for sealing the cathode-side distributor plate (K) and the second film web (B2) for sealing the anode-side distributor plate (A) are made from the same thermoplastic polymer or copolymer.

16. The method according to claim 8, wherein the first film web (B1) for sealing the cathode-side distributor plate (K) and the second film web (B2) for sealing the anode-side distributor plate (A) are provided as an extrusion film made by screw extrusion.

17. The method according to claim 8, wherein the first film web (B1) for sealing the cathode-side distributor plate (K) and the second film web (B2) for sealing the anode-side distributor plate (A) are provided as an extrusion film made by coextrusion.

18. The method according to claim 9, wherein the first film web (B1) for sealing the cathode-side distributor plate (K) and the second film web (B2) for sealing the anode-side distributor plate (A) are provided as a multilayer film with a plurality of functional layers which have different melting temperatures.

* * * * *